Aug. 18, 1970    G. J. FRYE    3,524,993
TRIGGERING METHOD AND APPARATUS WHEREIN THE TRIGGERING
PERIOD IS DETERMINED
Filed Feb. 17, 1967    2 Sheets-Sheet 1

George J. Frye
INVENTOR
BY
BUCKHORN, BLORE, KLARQUIST & SPARKMAN
ATTORNEYS

George J. Frye
INVENTOR

BY
BUCKHORN, BLORE, KLARQUIST & SPARKMAN
ATTORNEYS

United States Patent Office 3,524,993
Patented Aug. 18, 1970

3,524,993
TRIGGERING METHOD AND APPARATUS WHEREIN THE TRIGGERING PERIOD IS DETERMINED
George J. Frye, Portland, Oreg., assignor to Tektronix, Inc., Beaverton, Oreg., a corporation of Oregon
Filed Feb. 17, 1967, Ser. No. 616,895
Int. Cl. H03k 4/00
U.S. Cl. 307—228                          13 Claims

ABSTRACT OF THE DISCLOSURE

A triggering method and apparatus for oscilloscopes and the like wherein a triggering signal, derived from portions of a recurrent input signal, is in effect delayed for a time slightly less than the period between recurring input signals. In this manner a triggering signal, derived from one input signal, is used to trigger the oscilloscope sweep for the next occurrence of the input signal such that the portion of the input signal causing triggering and other selected portions will not be omitted from the oscilloscope presentation.

BACKGROUND OF THE INVENTION

The present invention relates to a triggering method and apparatus, and particularly to such a method and apparatus for providing triggering coincident with any selected portion of an input signal.

In a triggered instrument such as an oscilloscope, it is frequently desirable to view various selectable portions of the input signal, for example, the event providing oscilloscope triggering. Generally the ability to measure the triggering event is made difficult because a finite time is needed for a conventional trigger circuit to recognize and respond to the triggering event. Thus by the time a conventional triggering circuit may have responded to the event, the event has already passed. It is common practice to insert a delay line in the manner shown in FIG. 1 in order to allow measurement of the triggering event. The function of the delay line is the introduction of delay in the signal channel such that the measurement device has in effect been triggered before the triggering event arrives through the delay line. Unfortunately, the delay line in the signal channel may introduce signal distortion.

As an alternative, selective triggering may be achieved in a system employing a pair of ramp generator circuits. In such a system a triggering signal, derived from an input signal, is applied to a first ramp generator circuit where it initiates the start of a first ramp waveform. A selected level of the first ramp waveform triggers a second ramp generator circuit producing a second ramp waveform for application to the oscilloscope or the like for producing horizontal deflection. By manual adjustment of the length of the first ramp or the starting level for the second, it is possible to initiate the second ramp coincident and any portion of a recurrence of an input signal, for example, the event which was employed to cause triggering. However, this arrangement has the disadvantage that only every other occurrence of the input signal can be examined since intermediate occurrences of the signal are employed solely for triggering. Also, this system must be manually adjusted as when a change in the period of occurrence of the input signal takes place.

SUMMARY OF THE INVENTION

According to the method and apparatus of the present invention, a triggering signal is derived in the usual manner from portions of a recurring input signal. In addition, the period of recurrence of the input signal, or the period between corresponding recurring triggering signals, is automatically determined. Then triggering of the instrument is delayed by a time corresponding to such period of recurrence so that triggering actually takes place upon the next occurrence of the recurring input signal. It is frequently desirable in practice for such delay to be less than the period of recurrence of the input signal, or the period between recurring triggering signals, so that triggering of the instrument may in effect occur before the triggering event. Triggering can be suitably adjusted to occur at any desired time relative to the input signal.

Accordingly, an object of the present invention is to provide an improved method and apparatus for triggering an instrument such as an oscilloscope.

It is another object of the present invention to provide an improved triggering method and apparatus for measuring an input signal with less distortion.

It is another object of the present invention to provide an improved method and apparatus for providing triggering of an instrument at a time relative to an input signal such that the triggering may in effect occur before the input signal occurs, or before the occurrence of the event used for triggering.

It is another object of the present invention to provide an improved triggering method and apparatus for providing triggering coincident with selected portions of an input signal.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with a accompanying drawings where like reference characters refer to like elements.

DRAWINGS

DETAILED DESCRIPTION

Figure 1:
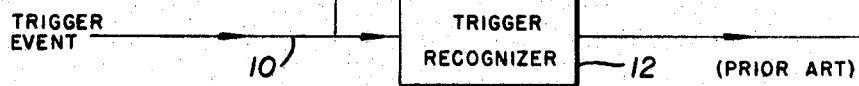
FIG. 1 is a schematic diagram of a prior art triggering system.

As hereinbefore stated FIG. 1 illustrates a prior art circuit for an instrument such as an oscilloscope wherein a periodically recurring input signal at 10, including a triggering event, operates trigger recognizer 12 coupled to an instrument or measuring device 14. If the instrument or measuring device is an oscilloscope, the triggering recognizer typically initiates operation of the oscilloscope horizontal sweep circuit for thereby operating the instrument in timed relation with the input signal. The periodically recurring input signal itself passes through delay line 16 before reaching device 14. Again, if such a device is an oscilloscope, the delayed signal is suitably amplified and applied to the vertical deflection plates of the oscilloscope for producing a visual presentation on the oscilloscope screen. Thus the triggering event has time to be recognized for initiating triggered operation of the instrument or measuring device before the input signal itself reaches the measuring device. However, this system requires the use of delay in the signal channel which must be practically distortionless if a true representation of the signal is to reach the measuring device.

Figure 2:
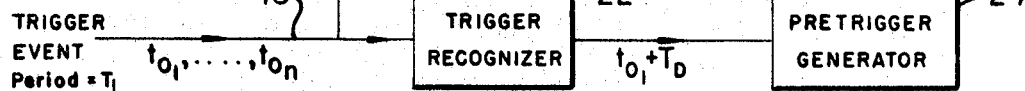
FIG. 2 is a simplified block diagram of a triggering system according to the present invention.

In accordance with the present invention, a recurrent or periodic input signal, including a triggering event, is applied at 18 in FIG. 2 directly to the measurement device 20, and through a conventional trigger recognizer 22 to an automatic pretrigger generator 24 from which a triggering output at 26 is supplied to the measurement device. The input signal and more particularly the triggering event occurs periodically at times which may be designated as $t_{0_1} \ldots t_{0_n}$. The period of the input signal is taken as $T_1$, this also being the period of the triggering event and of the trigger output produced by trigger recognizer 22. In general, $T_1 = t_{0_2} - t_{0_1} = t_{0_n} - t_{0_{n-1}}$, as long as the period remains constant.

The trigger recognizer 22 first produces an output at a time $t_{0_1} + T_D$, wherein $T_D$ is a delay which may take place in the trigger recognizer. This signal is applied to pretrigger generator 24 and, according to the present invention, generator 24 in effect delays such trigger for a time related to the period, $T_1$, of the recurring input signal. The pretrigger generator automatically determines the period, $T_1$, of the recurring input signal and delays the output of the pretrigger generator until approximately the end of such period. Then this output of the pretrigger generator can be used to initiate operation of the measuring device or instrument substantially coincident with the next occurrence of the recurrent input signal, i.e. at time $t_{0_2}$. The time $t_{0_2} = (t_{0_1} + T_D) + (T_1 - T_D)$.

Figure 3:
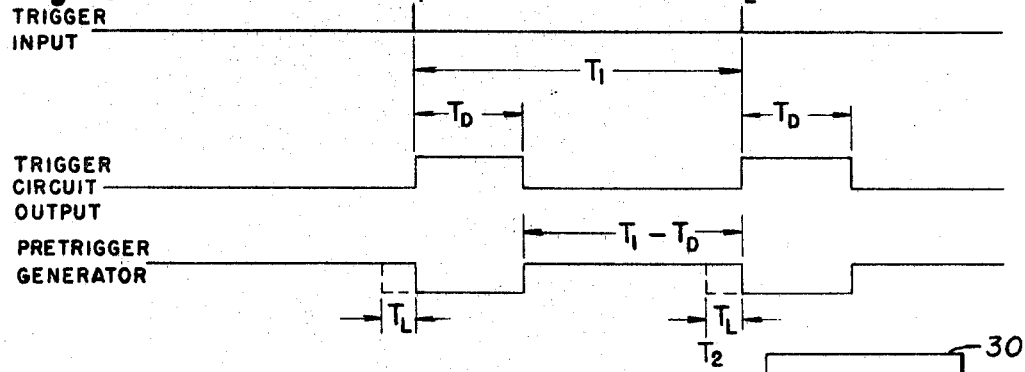
FIG. 3 is a plot of waveforms illustrating operation of the triggering system according to the present invention.

The output of the pretrigger generator 24 may be adjusted by a timed quantity $T_L$, as indicated in FIG. 3, so that a triggering output $T_2$ at 26 may actually occur before $t_{0_2}$, or at a time before the next recurrence of the input signal. By adjustment of $T_L$, the time of operation of the measurement device is suitably adjusted. The delay in pretrigger generator 24 is suitably shortened by such a predetermined amount, $T_L$, whereby the triggering event itself may be examined if so desired.

Figure 4:
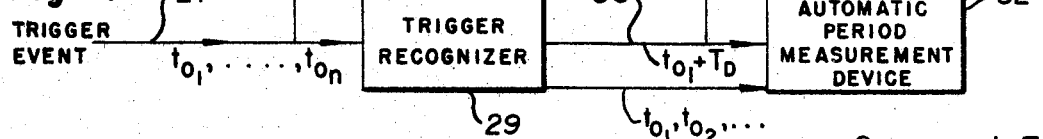
FIG. 4 is a block diagram illustrating a preferred form of a triggering system according to the present invention.

In FIG. 4, a preferred embodiment of the present invention is illustrated in block diagram form. Again, the periodic input signal is applied at 27 to trigger recognizer 29 as well as to measurement device 30 which may comprise an oscilloscope. In the FIG. 4 circuit, an automatic period measurement device 32 is shown separately from the pretrigger generator 34. Here the output 36 from the trigger recognizer, occurring at $t_{0_1} + T_D$, is applied both to the automatic period measurement device 32 and the pretrigger generator 34. In the automatic period measurement device, a DC control signal is developed which is proportional to $T_1 - T_D$, which signal controls the pretrigger generator 34 so that an output at $T_2$ is obtained. $T_1$ is the indicated period. Pretrigger generator 34 provides an output at 38. The output may also have an adjustable period $T_L$ subtracted therefrom so that the trigger may start before the next occurrence of the recurrent input signal. Thus, the output of pretrigger generator 34 at 38 occurs at a time $t_{0_2} - T_L$, that is at time $T_2$.

The operation of the FIG. 4 circuit (as well as the FIG. 2 circuit) may be further explained in connection with the waveform chart of FIG. 3. Referring to FIG. 3, a first occurrence of an input signal includes a triggering event at $t_{0_1}$ and trigger recognizer 29 produces an output at $t_{0_1} + T_D$, wherein $T_D$ is delay in the trigger recognizer 29. Then, automatic period measurement device 32 determines, from previous recurrences of trigger recognizer outputs, the period, $T_1$, thereof. Automatic period measurement device 32 then produces a DC output controlling pretrigger generator 34 such that it produces its output at 38 at the time $t_{0_2}$ when the next recurrence of the input signal takes place, or at a time slightly before such occurrence takes place because of the substraction of $T_L$ from the timed output of pretrigger generator 34.

Figure 5:
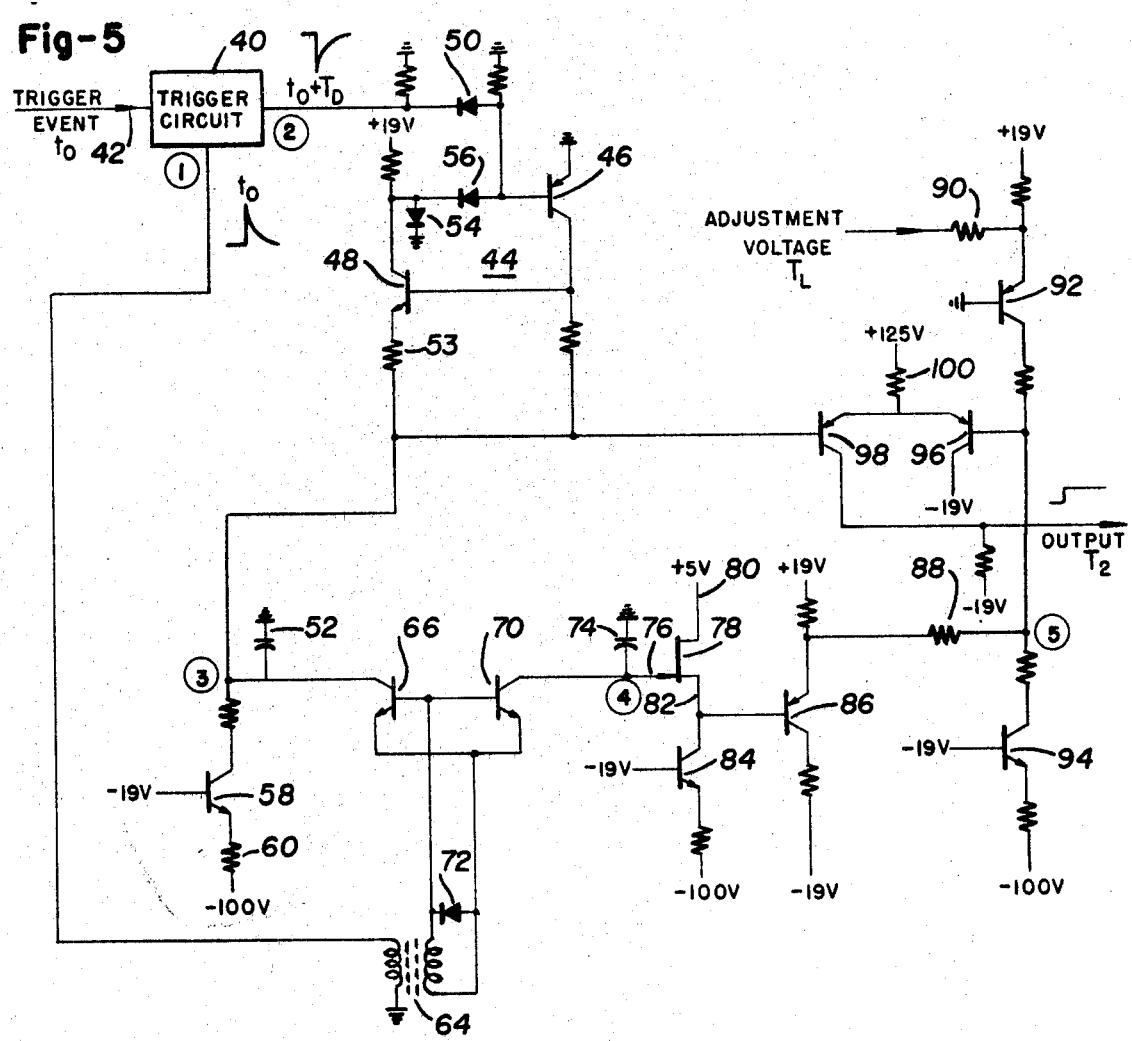
FIG. 5 is a schematic diagram of a circuit according to such preferred form.

FIG. 5 is a schematic diagram of a particular circuit form of the FIG. 4 apparatus. In this circuit, a trigger recognizer comprising trigger circuit 40 produces a first output ① at a time which may be slightly delayed with respect to the occurrence of a recurrent input signal at 42. This slight delay will be ignored for purposes of explaining the present circuit. Trigger recognizer 40 also produces a second output ② at $t_0 + T_D$ or at a time delayed with respect to output ① by a time period $T_D$. Output ② operates a multivibrator 44 comprising a first PNP transistor 46 driving a second NPN transistor 48. In this circuit, both transistors are normally nonconductive. The negative going output signal ② is applied through negatively poled diode 50 to the base of transistor 46, whereby this negative signal causes transistor 46 to conduct. The positive going output at the collector of transistor 46 is applied to the base of transistor 48 whereby the latter transistor also conducts.

Transistor 48 starts conduction providing a discharge path for negatively charged capacitor 52 through the emitter-collector path of transistor 48. A first terminal of capacitor 52 is coupled to the emitter of transistor 48 through resistor 53, and the remaining terminal of capacitor 52 is connected to ground. The collector of transistor 48 is also coupled to the base of transistor 46 through negatively poled diode 56 providing feedback. Conduction in the two transistors is cumulative and saturation of both transistors very rapidly takes place. It should be noted that a considerable portion of the current then flowing through transistor 48 is drawn from capacitor 52 which is originally negatively charged. After the transistors saturate and capacitor 52 is discharged to ground level, such level being established by positively poled diode 54 connected from the collector of transistor 48 to ground, the current through transistor 48 ceases and both transistors 48 and 46 are automatically and quickly reset to the nonconducting condition. This cycle of events takes place very rapidly for discharging capacitor 52. Now, the capacitor 52 recharges in the negative direction through transistor 58, the emitter of which is coupled to —100 volts through long-tail emitter resistor 60.

Figure 6:
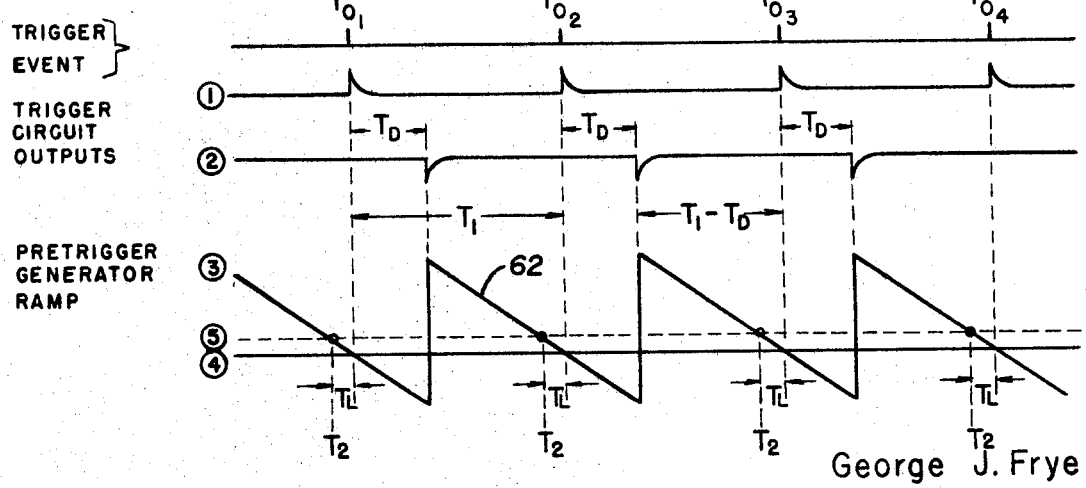
FIG. 6 is a plot of waveforms illustrating the operation of the FIG. 5 circuit.

The voltage at point ③ on the diagram is also illustrated at ③ on the waveform chart of FIG. 6. It is seen that the capacitor 52 is discharged at a time $t_{0_1} + T_D$, the most positive excursion of which is approximately ground level, and then the capacitor starts charging negatively forming ramp 62. At time $t_{0_2}$, output ① from trigger recognizer 40 occurs and is applied through transformer 64 to NPN transistors 66 and 70, the bases of which are connected together and the emitters of which are also connected together. The secondary of transformer 64 is coupled across this circuit so as to apply a positive pulse at the bases of these transistors with respect to their emitters at time $t_{0_2}$. A negatively poled diode 72 across the transformer secondary removes negative secondary excursions. The collector of transistor 66 is coupled to the ungrounded terminal of capacitor 52. Transistors 66 and 70 form a gate and at time $t_{0_2}$ the voltage across capacitor 52 is connected across a memory storage capacitor 74 coupled to the collector of transistor 70. At time $t_{0_2}$ the value which ramp 62 has reached is placed upon a first terminal of memory storage capacitor 74, the opposite terminal of capacitor 74 being grounded. Then the gate comprising capacitors 66 and 70 is disabled by the removal of output ① whereby the charge on capacitor 74 is retained, under substantial steady state conditions, at the value of the ramp at time $t_{0_2}$. This steady value is indicated at ④ on the FIG. 6 waveform plot.

The ungrounded terminal of capacitor 74 is connected to the gate terminal 76 of a field effect transistor 78, having its drain terminal 80 connected to a positive voltage and its source terminal 82 connected to the collector of current source transistor 84. The base of transistor 84 is connected to a negative voltage and the emitter thereof is connected to a negative voltage supply. Transistor 84 provides a substantially constant current source for the field effect transistor 78 so that the current through field effect transistor 78 does not change materially despite changes in output voltage at source terminal 82. As will be appreciated by those skilled in the art, the field effect transistor presents a very high impedance at its gate terminal so as to prevent substantial discharge of memory storage capacitor 74, while at the same time also providing a measure thereof at source terminal 82. The source terminal 82 is coupled through impedance transforming emitter follower transistor 86 to a coupling resistor 88, connecting the emitter of transistor 86 to point ⑤ in the circuit. Transistors 78, 84 and 86 form a buffer circuit for isolating memory storage capacitor 74 from the rest of the circuit while at the same time providing its voltage thereto.

Point ⑤ is maintained at a voltage substantially equal to the voltage across memory storage capacitor 74 plus an adjustment voltage, voltage $T_L$. Adjustment voltage $T_L$ is provided through coupling resistor 90 connected to the emitter of PNP transistor 92.

The DC potential at point ⑤ relative to point ④ is the result of current flow through resistor 88, the voltage drop across this resistor being affected by the $T_L$ adjustment voltage. When this $T_L$ voltage adjustment is set for zero volts, the current which flows into the emitter of transistor 92 from its positive supply flows out the collector of transistor 92 and through the collector of transistor 94 to the −100 volt supply. At this time the voltage at point ⑤ is nearly the same as the voltage at point ④. If the $T_L$ adjustment voltage is adjusted positive, then point ⑤ is more positive than point ④ as indicated on the FIG. 6 waveform plot. The $T_L$ adjustment voltage may alternatively be adjusted in a negative direction.

Transistors 96 and 98 form a differential comparator wherein the transistor emitters are connected together and coupled to a positive source through emitter resistor 100. The base of transistor 96 is connected to point ⑤ while the base of transistor 98 is coupled to point ③. When the generated ramp at point ③ is at a potential more positive than point ⑤, transistor 98 is nonconducting and transistor 96 is in a conducting state. However, when the ramp passes through a voltage lever equal to that of point ⑤, transistor 96 switches off and transistor 98 switches on producing an output $T_2$ at a time $T_L$ before $t_0$. It can be seen that the ramp generating circuit comprises a timing means or measurement device for determining the preiod of the input signal or the period of triggering signals related thereto. It can also be seen that adjustment of $T_L$ adjustment voltage will allow a leading or lagging output at $T_2$ with respect to $t_0$. The general operation of the FIG. 5 circuit and the application of the output in an instrument is the same as that explained with reference to the circuit of FIG. 4 or the circuit of FIG. 2. That is, as stated above, the output $T_2$ is produced substantially coincident with the subsequent occurrence of the recurrent input signal, i.e. at time $t_{02}$, or at $T_L$ before $t_{02}$. The DC control signal developed at ④ is representative of the period $T_1$.

When a periodically recurring signal is mentioned in this application, it is intended to mean a signal which recurs periodically or intermittently whereby such a signal is conveniently viewed on a cathode ray oscilloscope or the like because of its repetition. It is not meant to imply that the period remains fixed. As a matter of fact, the period may vary. One of the principal advantages of the method and apparatus of the present invention relates to automatic period measurement such that variations in period are automatically taken into account and whereby no manual adjustment need be made to compensate for change in the signal period. The period is automatically and continuously measured, e.g., by the circuitry illustrated in FIG. 5, and an output related to the next or subsequent occurrence of the input signal is produced for synchronizing the operation of a measurement device or instrument.

Trigger recognizer circuit 40 is of the type generally employed in the art, e.g. of the type illustrated in Dalton Pat. 3,215,948 as a sweep trigger multivibrator.

While I have shown and described several embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In an instrument responsive to a periodically recurring signal,
    means for deriving a recurring triggering signal in timed relation to said recurring signal, wherein said triggering signal is derived from a selected portion of said recurring signal,
    means for delaying a first said triggering signal for a period of time substantially less than the period between occurrences of said recurring signal,
    means for initiating a ramp signal at the occurrence of such first triggering signal as delayed,
    means for sampling the value of said ramp signal at the occurrence of the next triggering signal,
    means for remembering such value, and
    comparison means for detecting when said ramp signal initiated by the first triggering signal reaches such value for producing an effective triggering signal for operating said instrument.

2. The apparatus according to claim 1 wherein said remembered value has an additional value added thereto for comparison with said ramp signal initiated by said first triggering signal so that said effective triggering signal may be produced before the next occurrence of the recurring signal.

3. In an instrument responsive to a periodically recurring signal,
    means for deriving a triggering signal for operation of said instrument in timed relation with said recurring signal, wherein said triggering signal is derived from recurring portions of said triggering signal,
    means for delaying said triggering signal,
    means for generating a ramp signal upon the occurrence of said triggering signal as delayed,
    memory means,
    a gate means responsive to the next occurrence of said triggering signal for sampling said ramp signal and placing the value of said ramp signal at such time into said memory means, and
    means for determining when said ramp signal has reached a value equal to said remembered value plus said additional value to produce an output related to the next occurrence of said recurring signal.

4. The apparatus according to claim 3 wherein:
    said means for determining when said ramp signal has reached a given value comprises voltage comparison means, and
    buffer means between said memory means and said voltage comparison means.

5. The apparatus according to claim 3 wherein said memory means comprises a capacitor coupled to the gate of a field effect transistor.

6. An instrument responsive to a periodically recurring input signal comprising:
    means for deriving a first triggering signal in timed relation with the recurring input signal,
    means responsive to the first triggering signal for initiating a ramp signal,
    means for sampling the value of the ramp signal before the conclusion of the ramp signal and at the occurrence of a next triggering signal,
    means for remembering such value, and
    comparison means for detecting when the ramp signal reaches such value for producing an additional triggering signal for operating the instrument in timed relation with a subsequent occurrence of the recurring input signal.

7. The instrument according to claim 6 wherein the ramp signal is initiated at a time after the occurrence of the first triggering signal, wherein such time is substantially less than the period between occurrences of the recurring input signal.

8. The instrument according to claim 7 further including means for adding an additional value to the remembered value for comparison with the ramp signal so that the additional triggering signal may be produced before the next occurrence of the recurring input signal.

9. The instrument according to claim 6 wherein the means for sampling comprises a gate means responsive to the next occurrence of a first triggering signal for providing the value of the ramp signal at such time to the means for remembering such value.

10. The instrument according to claim 6 wherein the means for remembering such value comprises a capacitor coupled to the gate of a field effect transistor.

11. The method of triggering an electrical instrument which is responsive to a periodically recurring input signal, comprising:
 deriving triggering signals from recurring portions of the recurring input signal,
 initiating a ramp waveform in response to a triggering signal,
 sampling the ramp waveform in response to the occurrence of a next triggering signal and remembering the sampled value,
 detecting when the ramp waveform again reaches the sampled value, and
 generating an additional triggering signal in response to such detection for operating the instrument in timed relation with a subsequent occurrence of the recurring input signal.

12. The method according to claim 11 further including adding a quantity to the remembered sampled value before detecting when the ramp waveform reaches the sampled value so that the additional triggering signal may be produced before the next occurrence of the recurring input signal.

13. The method according to claim 11 wherein the ramp signal is initiated at a time after the occurrence of the first triggering signal, wherein such time is substantially less than the period between occurrences of the recurring input signal.

References Cited

UNITED STATES PATENTS

| | | | |
|---|---|---|---|
| 2,887,530 | 5/1959 | Pacini | 178—7.3 |
| 2,951,985 | 9/1960 | Hudson et al. | 324—88 X |
| 3,071,733 | 1/1963 | Holzer et al. | 328—63 X |
| 3,317,743 | 5/1967 | Rogers | 328—63 |

DONALD D. FORRER, Primary Examiner

R. C. WOODBRIDGE, Assistant Examiner

U.S. Cl. X.R.

178—7.5; 307—269; 315—24; 328—63, 231

PO-1050
(5/69)

UNITED STATES PATENT OFFICE
CERTIFICATE OF CORRECTION

Patent No. 3,524,993          Dated August 18, 1970

Inventor(s) George J. Frye

It is certified that error appears in the above-identified patent and that said Letters Patent are hereby corrected as shown below:

Column 1, line 59, "and" should read --with--. Column 3, line 71, "substraction" should read --subtraction--. Column 5, line 41, "lever" should read --level--. Column 5, line 46, "preoid" should read --period--. Column 7, line 8, "7" should read --6--.

SIGNED AND
SEALED
OCT 27 1970

(SEAL)
Attest:

Edward M. Fletcher, Jr.
Attesting Officer

WILLIAM E. SCHUYLER, JR.
Commissioner of Patents